United States Patent [19]
Donegan

[11] Patent Number: 5,631,876
[45] Date of Patent: May 20, 1997

[54] CW SONAR WITH ADAPTIVE NOTCH REVERBERATION FILTER

[75] Inventor: James H. Donegan, Cupertino, Calif.

[73] Assignee: Lockheed Martin Corporation, Syracuse, N.Y.

[21] Appl. No.: 685,944

[22] Filed: Nov. 27, 1967

[51] Int. Cl.⁶ ................................................... G01S 15/00
[52] U.S. Cl. ................................................... 367/135
[58] Field of Search ........................ 340/3, 3 D, 3 FM; 343/7 RS; 114/23; 367/135

[56] References Cited

U.S. PATENT DOCUMENTS

| | | | |
|---|---|---|---|
| 3,022,486 | 2/1962 | Gettys et al. | 340/3 |
| 3,180,296 | 4/1965 | Hamilton et al. | 114/23 |

*Primary Examiner*—Daniel T. Pihulic
*Attorney, Agent, or Firm*—Paul Checkovich; Stephen Young

[57] ABSTRACT

A signal processor for continuous wave (CW) sonars of the type using a doppler filter bank for target detection, in which improved detection capability under reverberation limited conditions and particularly at relatively low doppler values is accomplished by introduction of an adaptive filter providing a notch filter characteristic centered on the mean frequency of the reverberation spectrum and of width and depth continuously automatically adjusted to conform at least approximately to the inverse of the reverberation spectrum. For effecting this adjustment the notch filter is made voltage variable and is enclosed within an automatic notch control (ANC) loop in which the notch control voltage is derived by comparison of signal level on one doppler filter on which appears reverberation plus noise against signal level on another on which appears noise only, to thus derive a control signal providing a measure of reverberation level. The ANC loop thus controlled operates in conjunction with associated automatic gain control (AGC) and automatic frequency control (AFC) loops, to "prewhiten" or flatten the reverberation and noise spectra in a manner such that each of the matched filters in the doppler bank may contribute equally to its output.

9 Claims, 4 Drawing Sheets

CW SONAR WITH ADAPTIVE NOTCH REVERBERATION FILTER

FIELD OF THE INVENTION

The invention herein described was made in the course of or under a contract, or subcontract thereunder, with the Department of the Navy.

This invention relates generally to object detection systems and more specifically to sonar systems of the type in which a continuous wave (CW) signal is processed on reception through a doppler filter bank for target detection. In accordance with the invention, the probability of detection in such systems may be significantly enhanced by addition to the signal processor of automatic control loops which together serve to flatten or "prewhiten" the reverberation-plus-noise spectrum in the signal input to the doppler bank. The background power density then is essentially constant over the doppler frequency range of interest, so all filters of the bank may be set to a common detection threshhold and all will contribute equally to the signal output, thus optimizing target detection capability.

DESCRIPTION OF THE PRIOR ART

Sonar systems employing CW transmission either unmodulated or in the form of long pulses have found wide use particularly in long range search applications, both for target detection and target classification purposes. In reverberation limited environments the performance of such CW sonars on high doppler targets generally is superior to other waveforms having a larger time-bandwidth product, but with relatively lower doppler targets CW sonar system performance may deteriorate due primarily to the non-flat spectral shape of the reverberation background and the resulting necessity for high doppler filter threshholds.

To avoid this performance degradation some CW sonar systems accomplish a flattening or "prewhitening" of the reverberation spectrum by interposing a fixed notch filter in the receiver signal processor usually just ahead of the doppler filter bank. While such fixed notch filters may result in performance improvement they necessarily represent a compromise since the center frequency and power density of reverberation are quite variable. Also, since a filter of this type will degrade system performance when detection is noise limited rather than reverberation limited, it is necessary to include means for switching the filter in and out of circuit, and to impose on the sonar operator the task of monitoring operating conditions sufficiently carefully that the filter is switched in when operation is reverberation limited and switched out when noise limited. Various proposals for automating notch filter control have also been made, but generally these have suffered from undue complexity of the additional circuitry required or have otherwise compromised system design or performance at least under some operating conditions.

SUMMARY OF THE INVENTION

The present invention has as its principal objective the provision of signal processors for pulsed CW sonar receivers in which the target detection capability of the system is optimized by provision of an adaptive notch filter which is self-adjusting under all operating conditions, whether reverberation or noise limited, to flatten the reverberation-noise background spectrum over the frequency band covered by the doppler filter bank so as to equalize the contribution of each individual filter of the bank. To these ends the signal processor of this invention preferably incorporates three control loops including an automatic gain control (AGC) loop for holding background noise level substantially constant, an automatic notch control (ANC) loop including an adaptive notch filter and means for adjusting its filter characteristic so as to conform substantially to the inverse of the reverberation spectrum, and an automatic frequency control (AFC) loop for holding the reverberation spectrum centered on the notch frequency. As will later be described in detail, the adaptive notch filter in the ANC loop is of voltage variable type with its control voltage derived by comparison of signal levels on two spaced teeth of the doppler comb, one located adjacent its center and one adjacent an end, with the notch error signal being generated by any difference in signal level across these teeth. Preferably, means for sensing signal level on a third tooth of the comb and introducing this signal level into the derivation of notch control voltage are provided for the purpose of making this control insensitive to target signals, so that target detection capability is not compromised by any adjustment of filter characteristic which might otherwise occur in response to target signals.

BRIEF DESCRIPTION OF THE DRAWINGS

The foregoing and other objects, features and advantages of the invention will be more fully understood by reference to the appended claims and to the following detailed description when read in conjunction with the accompanying drawings, wherein:

DESCRIPTION OF THE PREFERRED EMBODIMENT

Figure 1:
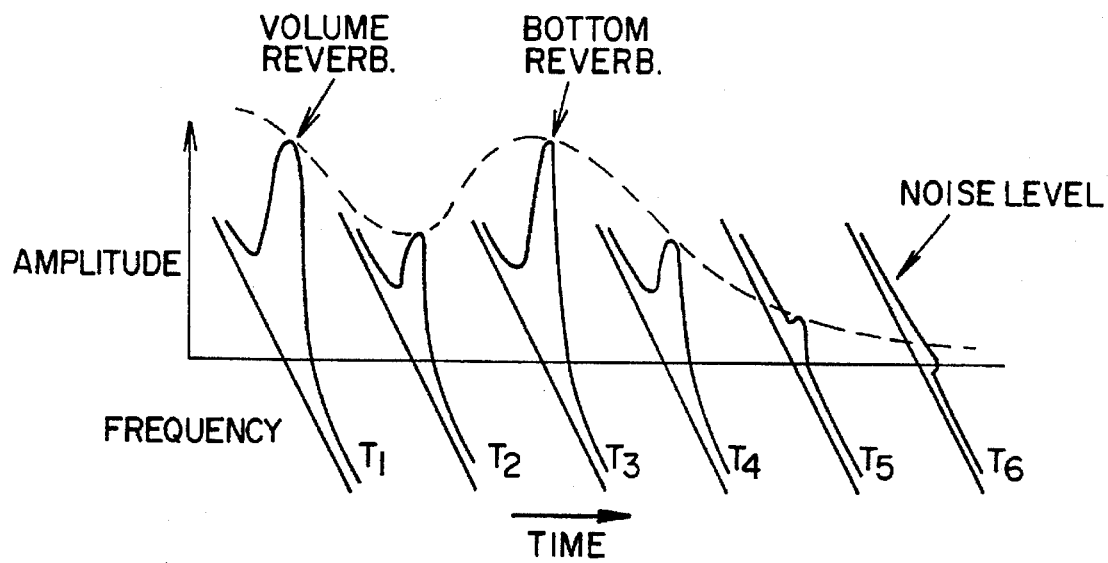
FIG. 1 is a representation or model of a typical reverberation and noise background spectrum in the received signal of a CW sonar.
Figure 2:
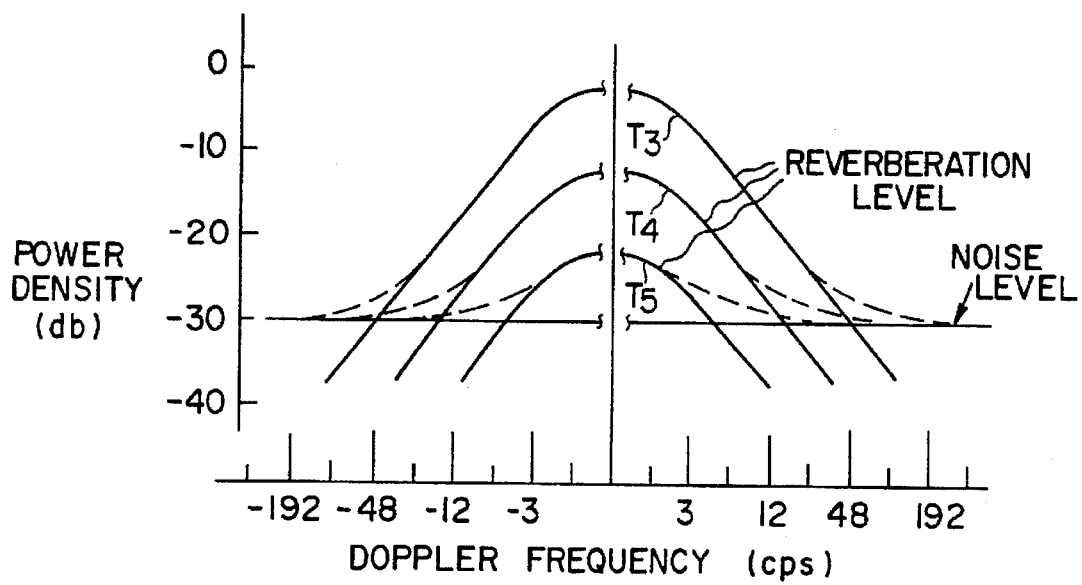
FIG. 2 illustrates three samplings of the reverberation and noise spectrum of FIG. 1, at different times corresponding to $T_3$, $T_4$ and $T_5$ in FIG. 1.

With continued reference to the drawings, wherein like reference numerals have been used throughout to designate like elements, FIG. 1 represents a reverberation and noise model useful in understanding the operation of the adaptive notch filter receiver of this invention. As shown, during the ping interval the reverberation bandwidth and spectrum slope are assumed approximately constant; reverberation power density however varies widely up and down with range and ultimately fades into the noise background as at the right in FIG. 1. FIG. 2 illustrates several cuts of the reverberation-noise spectrum depicted in FIG. 1, at different range or time values corresponding to times $T_3$, $T_4$ and $T_5$ in that figure.

As previously noted, the signal processor of this invention has primary application in CW sonars of the type comprising a contiguous comb doppler filter bank followed by detection, integration and "greatest of" circuitry. Such receivers afford greatest target detection capability where the background reverberation-noise spectrum in the signal input to the doppler filter bank is essentially flat, so that each of the matched filters in the bank may contribute equally to its output. In other words, optimum performance can be achieved only if the background power density at all frequencies of interest is brought to a common level just beneath the output detection threshhold which then is set the same for all filters in the bank. To provide this flattened or "prewhitened" reverberation-noise spectrum it is necessary to introduce a filter characteristic approximating the inverse of the combined background spectrum, which is defined by the relation:

$$|H(j\omega)|^2 = \frac{1}{R(\omega) + N(\omega)}$$

where

H(jω) is the voltage transfer function

R(ω) is the reverberation power density

N(ω) is the noise power density

As is apparent from FIG. 1, this combined background reverberation-noise spectrum is not constant but varies widely depending upon operating conditions as well as upon range and time, though as illustrated in FIG. 2, the reverberation spectrum may be assumed to be more or less constant in shape as it fades into the background with time. When added to the noise spectrum, which for present purposes may be assumed to be relatively flat, the power density of the combined reverberation-noise background is as shown by the dashed lines in FIG. 2. From these curves of FIG. 1 and 2 it will immediately be apparent that the conventional fixed notch filter, no matter how carefully the operator may apply it, cannot be fully effective under all conditions. Further, the necessity to switch the filter in and out presents an additional burden for the operator, and presents an opportunity for operator error which may significantly compromise system performance particularly if the notch happens to be left inserted when detection is not reverberation limited.

Figure 3:
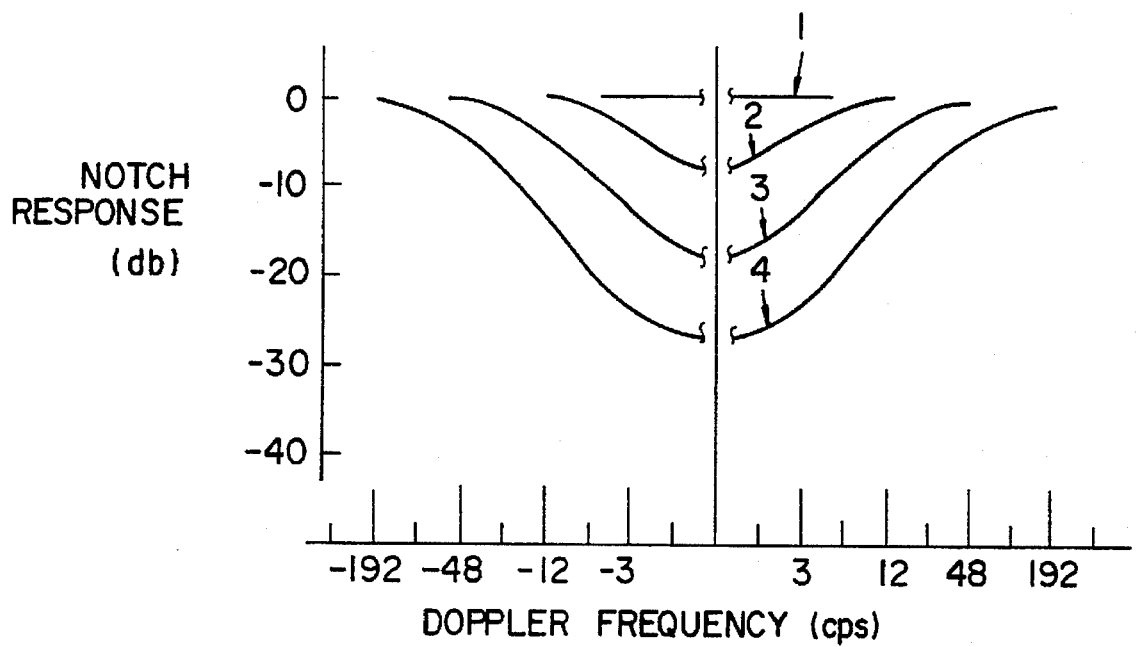
FIG. 3 illustrates notch filter characteristics which approximate the inverse of the reverberation-noise background spectrum of FIG. 2.

Ideally, an adaptive filter with filter characteristics which are the inverse of the background spectra shown in FIG. 2 would be most effective in flattening or prewhitening the background reverberation-noise spectrum. A filter characteristic satisfying this requirement is shown in FIG. 3, and as there illustrated it introduces a rejection band or notch which is centered on the reverberation spectrum, which is of depth and width adjustable as indicated by the several response curves 1, 2, 3 and 4, and which is of skirt slope generally corresponding to the inverse of the background reverberation-noise spectra shown in FIG. 2. The adaptive notch filter circuitry of this invention affords a filter characteristic very similar to the ideal as depicted in FIG. 3, with the necessary adjustment of notch depth and width being accomplished in the specific embodiment described by a voltage controlled inverse filter. This filter affords the different filter characteristics represented by curves 1-4 in FIG. 3 in response to a control voltage generated by sensing non-uniformity of level of the background reverberation-noise spectrum in the signal input to the doppler filter bank, as will be explained.

Figure 4:
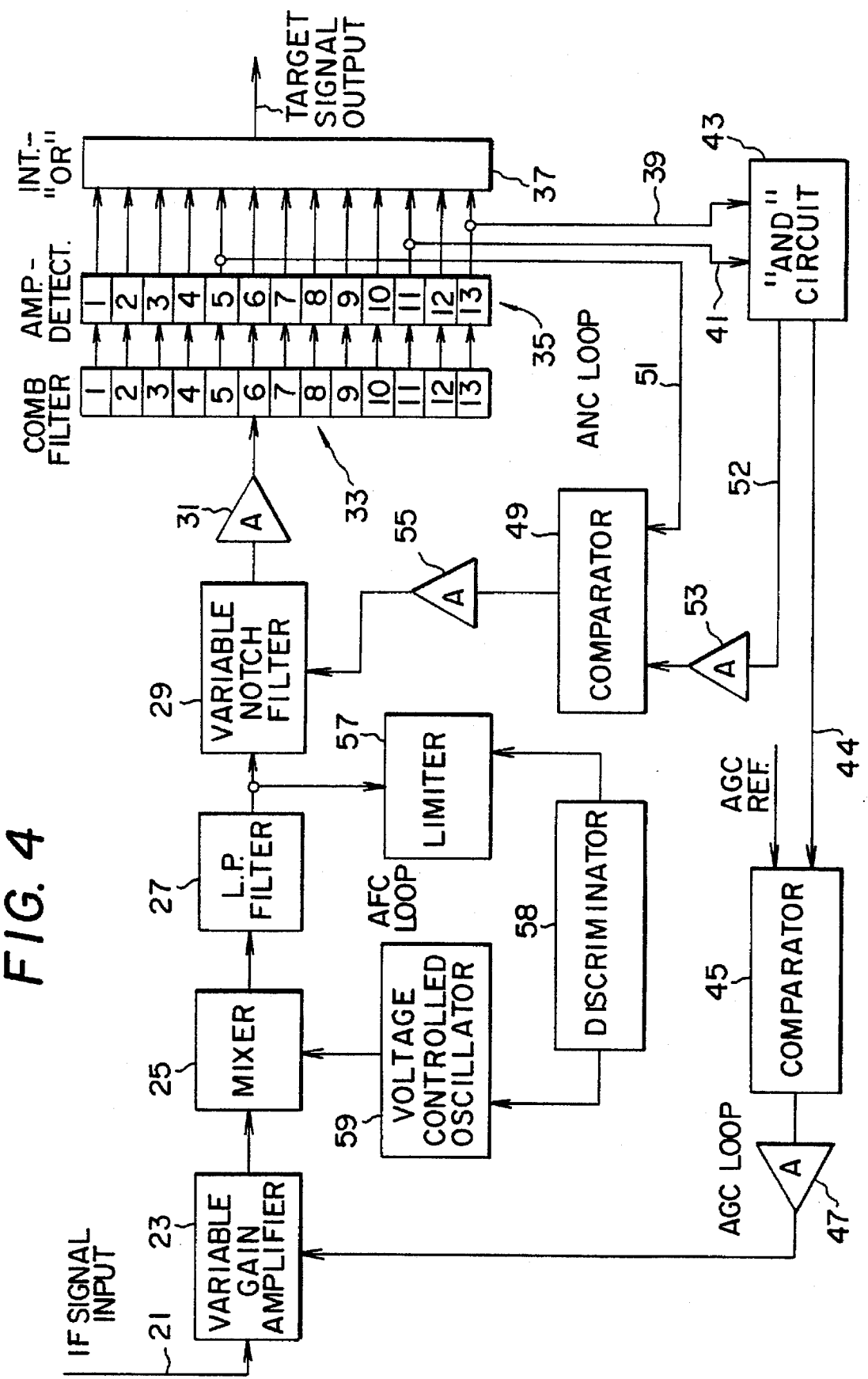
FIG. 4 is a block diagram of a sonar signal processor including means for implementing a variable notch filter characteristic like that of FIG. 3.

The block diagram of a sonar receiver signal processor in which the filter characteristic just described is implemented is illustrated in the FIG. 4, to which reference will now be made. The signal processor in the sonar receiver of FIG. 4 accepts on its input lead 21 the received signal at IF. This signal is processed through a variable gain amplifier 23 which forms part of an AGC loop, through a mixer 25 forming part of an AFC loop, through a low pass filter 27 to remove undesired modulation products of the mixer 25, through a variable notch filter 29 which forms part of an automatic notch control or ANC loop, and after amplification at 31 is transmitted to a doppler filter bank or comb filter 33. This comb filter may be of conventional configuration comprising a plurality of individual narrow band filters having their center frequencies staggered to cover the entire range of expected doppler frequencies. In the particular embodiment illustrated the filter comb comprises thirteen individual filters or teeth, with tooth 5 having its center frequency coincident with the zero doppler or IF carrier frequency.

Each tooth of the comb filter bank 33 transmits its output through one of a corresponding bank of amplifier-detector circuits 35 to an integrating and "OR" circuit 37 wherein these signals are combined in conventional manner to produce the "greatest of" signal which constitutes the system output. As previously noted, operation of the doppler filter bank is optimized if each tooth or individual filter in the bank contributes equally to the output, and this in turn requires that the background reverberation-noise spectrum in the signal input to the comb filter be essentially flat. The threshhold for each tooth of the comb may then be set just above the background and the contribution which each tooth will make both to detection and to false alarm ratio (FAR) may thus be equalized.

To accomplish this flattening of the reverberation-noise spectrum the AGC, AFC and ANC loops are together cooperative with each contributing to the desired result in a manner to be explained. Referring first to the AGC, this loop is designed to respond only to the noise power density at the upper end of the spectrum as measured by noise power signals taken from one or more teeth adjacent the high end of the filter bank. In the illustrated embodiment a noise power signal is taken on line 39 from tooth 13 of the filter and combined with a similar signal taken on line 41 from tooth 11 in an "AND" circuit 43. The purpose of introducing this "AND" logic is to render the control loop insensitive to target signals and to restrict its response to noise power signals, this being accomplished as will be explained in detail hereinafter with reference to FIG. 5.

The noise power level signal thus derived is transmitted on line 44 to a comparator 45 and there compared against a fixed AGC reference to derive an error signal which after amplification at 47 acts to control the variable gain amplifier 23 as necessary to hold the power density in teeth 11 and 13 of comb filter 33 constant with time. The gain of the AGC amplifier is flat at all frequencies of interest, so the input spectrum to the comb when no reverberation is present is flat and conventional AGC action then is obtained.

The automatic notch control (ANC) loop consists of the voltage variable notch filter 29 previously mentioned, the comb filter 33 with its amplifier-detector units 35, and a comparator circuit for generating an error signal in response to any difference in detected envelope between the center and end teeth of the comb, which it will be recalled have their center frequencies respectively coinciding with the center of the transmitted spectrum in the case of tooth 5 and, in the case of tooth 13, in the frequency band furthest removed from the transmitted spectrum. Since the greatest reverberation density normally will fall on or near the transmitted frequency and the least reverberation density normally will fall in the received frequency band furthest removed therefrom, and since noise level has been assumed to be constant over the frequency band of interest, the difference signal taken between the center and end teeth of the comb will provide at least a good approximation of the unequalized reverberation power density.

The power level signal from tooth 5 is transmitted via lead 51 to a voltage comparator 49, and a similar signal is transmitted via amplifier 53 and line 52 from the "AND" circuit 43 previously described, to which teeth 11 and 13 provide the signal inputs. As broadly explained with reference to operation of the AGC loop and as will be further explained hereinafter in reference to FIG. 5, this "AND" logic element serves to render the control loops insensitive to target signals and responsive only to noise power density on teeth 11 and 13.

Any difference or error signal output of comparator 49 resulting from inequality of signal levels on the center and end teeth of the comb is amplified at 55 and fed to the voltage control input of the variable notch filter 29. When reverberation is present, signal comparison across the center and end of the comb will produce an error signal which drives the notch in, and since as previously noted the notch is centered on the reverberation spectrum it attenuates that spectrum in direct relation to its reverberation power density. When the attenuation reaches a value sufficient to make the power density equal between center and end of the comb, the error signal is balanced and the notch remains at this value until a new error is developed. As reverberation decays into the noise level, the notch is gradually driven into the "flat" condition as desired, the particular manner in which this is accomplished being further described hereinafter by reference to the notch filter and control circuitry shown in FIG. 5.

The automatic frequency control (AFC) loop is of generally conventional configuration comprising a limiter 57, frequency discriminator 58, and voltage controlled oscillator 59 which feeds the mixer and filter elements 25 and 27 previously mentioned. This control loop is located ahead of the notch filter where the reverberation is still relatively peaked, and it senses any deviation of the mean frequency of the received signal spectrum from the notch center frequency which of course is the same as the nominal IF frequency. In response to any such frequency deviation, the discriminator 58 will generate a DC control voltage of polarity dependent upon the direction in which the frequency has shifted and of magnitude proportional to the frequency shift. This control voltage drives the voltage controlled oscillator 59 in a direction to correct the frequency error to within the system deadband. It has been found that the loop need not make 100% correction of any input frequency error nor accommodate a wide band of frequency error; typically the loop need be designed for say 85% correction of input frequency error only out to a limit of plus or minus 10 cycles.

Figure 5:
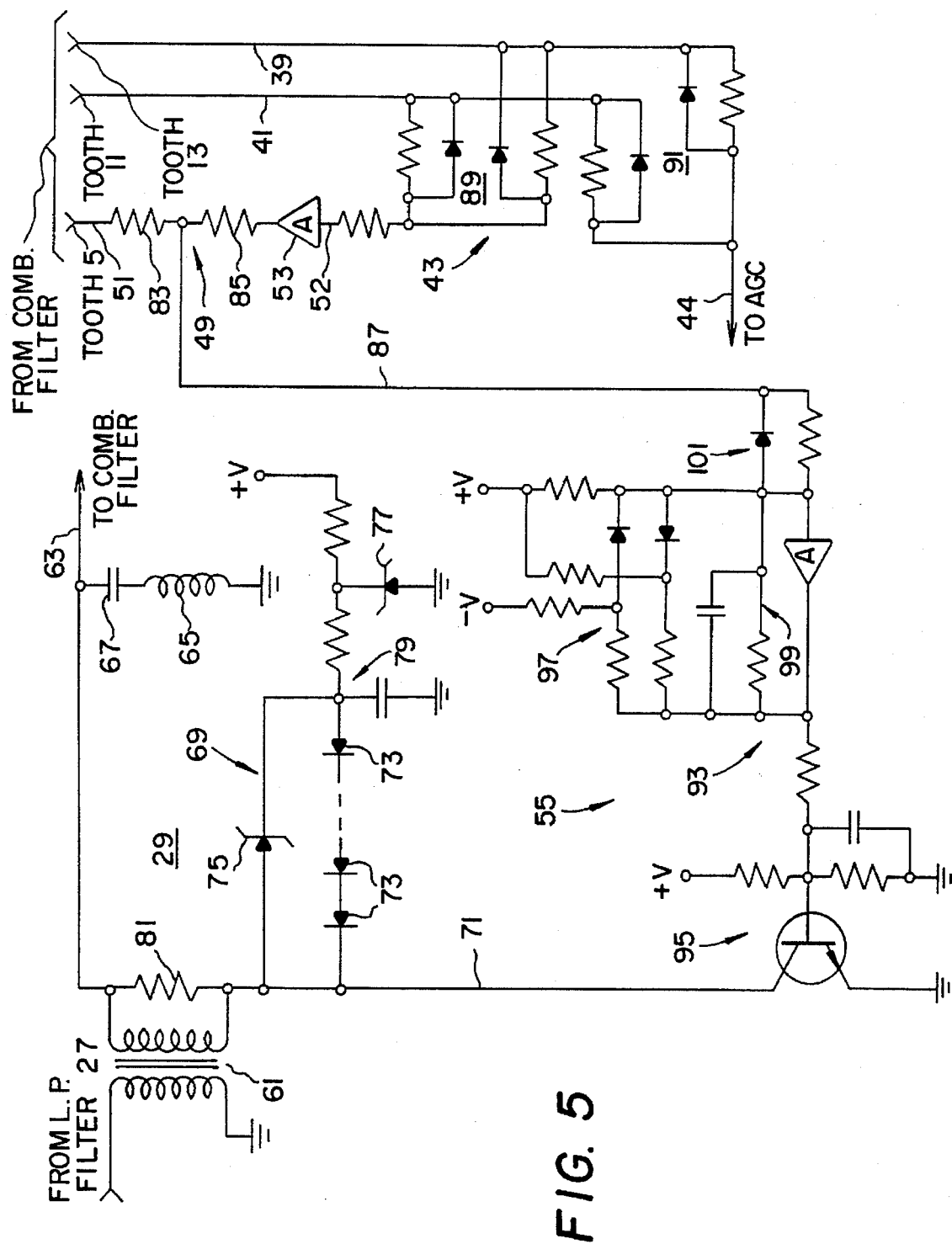
FIG. 5 is a schematic circuit diagram of parts of the automatic notch control and automatic gain control loops in the receiver signal processor of FIG. 4.

With reference now to FIG. 5 the construction and operation of certain elements of the AGC and ANC loops are illustrated in greater detail. As shown, the input signal as received from the low-pass filter 27 is transformer coupled as at 61 to the variable notch filter designated generally by reference numeral 29, and the output signal then is transmitted via line 63 to the comb filter 33 as previously described in reference to FIG. 4. The adaptive notch filter comprises a simple series-resonant circuit including an inductance element 65, capacitance element 67, and a voltage variable resistance element which is designated generally by reference numeral 69 and to which is supplied a control voltage input via line 71 from amplifier 55.

The voltage controlled resistance element 69 is constituted by one or more silicon diodes 73, ten such series connected diodes of 1N914 type having been found suitable in the particular embodiment being described. By adjustment of the control voltage level applied on line 71, the operating point of the diodes may be shifted along their current-voltage characteristic curve to an area of different slope thus affording a difference in the effective resistance they present to the filter circuit. To reduce diode noise and obtain a more uniform resistance characteristic at high levels of control voltage and correspondingly high diode current levels, the diodes preferably are bypassed by a zener diode 75 as shown to shunt a part of the current flow at control voltage levels above the zener breakdown voltage.

The voltage variable resistance thus constituted is connected to a stabilized voltage source comprising a zener diode 77 and an RC filter network 79, and in operation presents an effective value of resistance which may be shifted up or down by variation in the magnitude of the control voltage applied on line 71. When the voltage variable resistor is high in value the source impedance as seen by the L-C filter network 65-67 produces a relatively wide and deep notch as shown for example by curve 4 in FIG. 3; when the effective resistance value drops toward zero the notch narrows and becomes more shallow because swamped out by the low source impedance. Preferably a resistance element 81 is connected across the secondary of the input transformer 61 to reduce the swing in the loading of this transformer which otherwise would occur with change in the effective value of the voltage variable resistance 69.

The automatic notch control voltage on line 71, as previously explained, is derived by comparison of signal levels on the center and end teeth of the comb filter. To accomplish such comparison signals are supplied from tooth 5, via line 51, and from the end teeth after polarity inversion, via line 52, to a comparison circuit comprising resistance elements 83 and 85 having a common connection from which line 87 provides the comparator output. Since as previously explained the signal input needed from the comb end teeth for purposes of automatic notch control should reflect noise power density only, it is desirable that target signals appearing on these teeth be prevented from having any effect upon control of the notch filter characteristic. To provide this desired insensitivity to target signals, the power level signals from teeth 11 and 13 of the comb, appearing on lines 41 and 39 respectively, are connected as the two inputs to the "AND" circuit 43, which as shown comprises two separate logic "AND" elements 89 and 91 each consisting of two resistors paralleled by diodes poled as shown. With polarities as indicated the diodes are non-conductive to the normally positive polarity signal input from their respective comb filter tooth output amplifiers, and signal transmission from each amplifier can occur only through its series resistor and through the high impedance path defined thereby. Accordingly, if at any time signal appears in the output of only one of the filter amplifiers it will effectively be shunted back to the other through the "AND" element, due to the relatively high impedance of the series resistor in the line from the outputting amplifier as compared to the relatively low forward resistance of the diode providing a shunt path back to the other. With such "AND" characteristic, logic elements 89 and 91 will not transmit any signal from either tooth 11 or tooth 13 unless a like signal is simultaneously present on the other tooth. This requirement is met with respect to noise power signals, since noise power normally does not vary much over the narrow frequency range spanned by teeth 11 and 13, but it excludes target signals appearing on either tooth because such signal would normally not simultaneously appear on both.

The comparator output signal on line 87, called the notch error signal, thus reflects any difference in signal level between the center and end teeth of the comb, which in turn reflects any deviation of the spectrum from the flat condition across the comb. This notch error signal is amplified and integrated in the first stage 93 of a two-stage amplifier 55, then transmitted to a second stage or power amplifier 95 which impresses on line 71 the control voltage for the voltage controlled resistance 69. Feedback loops comprising resistance and diode elements interconnected, poled and biased as shown at 97 across the first-stage amplifier 93 provide cramping to prevent signal swings such as might drive the amplifier into saturation or overload requiring undesirably long recovery time. Another feedback loop, this comprising an R-C network as shown at 99, may be provided for achieving desired time constant of integration, and a resistance-diode network as shown at 101 may be included for achieving desired attack and decay time constants.

In operation of the automatic notch control loop just described, the signal level on tooth 5 will rise whenever reverberation occurs, and comparison of this signal level against that on teeth 11 and 13 will produce an error signal which will drive the notch in, thereby attenuating the spectrum in a manner approximating the strength of the reverberation spectrum. When the attenuation reaches a value sufficient to make the signal power density on the center and end teeth equal, the error signal then is balanced and the notch will remain at this value until a new error is developed. As reverberation decays into the noise level, the notch is gradually driven into the "flat" condition as desired. It will be noted that target signals appearing on teeth 11 and 13 do not affect operation of the automatic notch control loop, by reason of their connection through the "AND" network 89. Since tooth 5 corresponds to zero doppler it of course will carry no significant target signal.

The automatic gain control loop previously described is made similarly unresponsive to target signals, by deriving the noise level signal used for AGC from comb teeth 11 and 13 through a second logic "AND" network as shown at 91 in FIG. 5. It will of course be appreciated that if impedance levels in the respective ANC and AGC loops permit, only a single logic "AND" network might be substituted for the two such networks in the illustrated embodiment.

From the foregoing it will be apparent that the AGC, AFC and ANC control loops described may together control the reverberation and noise spectrum so as to hold it essentially flat across all teeth of the doppler filter bank under all operating conditions irrespective of changes in noise power density, in reverberation power density or center frequency, and without sensitivity to target signal input. With the reverberation and noise spectrum thus flattened, each of the matched filters in the doppler bank may contribute equally, with all operating to a common and relatively lower output detection threshhold. Each tooth in the doppler bank then will contribute equally to detection and false alarms, and the detection capability of the system thus is optimized.

While in this description of the invention only certain presently preferred embodiments have been illustrated and described by way of example, many modifications will occur to those skilled in the art and it therefore should be understood that the appended claims are intended to cover all such modifications as fall within the true spirit and scope of the invention.

What is claimed as new and desired to be secured by Letters Patent of the United States is:

1. In a continuous wave sonar receiver for detecting target signal content of a received signal spectrum also containing reverberation and noise, a receiver signal processor comprising:

(a) a doppler comb filter having said received signal transmitted thereto and comprising a plurality of filter teeth spaced over a substantial doppler frequency range including zero doppler;

(b) means for deriving a measure of the reverberation spectrum in said received signal comprising comparator means for generating a control signal in response to difference of signal levels sensed on selected teeth of said comb filter, a first such comb filter tooth being located near the zero doppler frequency and a second comb filter substantially spaced therefrom; and (c) adaptive notch filter means responsive to said control signal to insert in said received signal as transmitted to said doppler comb filter a notch of form approximating the inverse of the reverberation spectrum as thus measured.

2. A sonar receiver signal processor as defined in claim 1 further including an automatic gain control loop comprising:

(a) means responsive to signal level on said second comb filter tooth to derive a signal indicative of noise content of said received signal;

(b) means for generating an AGC signal by comparison of said noise signal against a reference; and (c) means responsive to said AGC signal for adjusting the level of said received signal as transmitted to said doppler comb filter.

3. A sonar receiver signal processor as defined in claim 2 further including an automatic frequency control loop comprising:

(a) means for sensing deviation of the mean frequency of the received signal spectrum from the zero doppler frequency and generating an error signal indicative of any such frequency deviation; and (b) means responsive to said error signal for correcting the frequency deviation sensed.

4. A sonar receiver signal processor as defined in claim 1 wherein the measure of reverberation spectrum is made insensitive to target signals appearing on said second filter tooth by further including:

(a) means for sensing signal level on a third tooth of said doppler comb filter adjacent said second tooth; and (b) means responsive to sensed signal levels on said second and third teeth and operative to transmit to said comparator means only signals common to both said teeth.

5. A sonar receiver signal processor as defined in claim 1 wherein said adaptive notch filter means comprises a voltage variable resistance in a series resonant circuit, and wherein said control signal is a variable voltage which adjusts the notch filter characteristic to approximate the inverse of the reverberation spectrum.

6. In a continuous wave sonar receiver for detecting target signal content of a received signal spectrum also containing reverberation and noise:

(a) a receiver signal processor comprising a doppler filter bank to which said received signal is transmitted and which includes a plurality of filter elements with center frequencies staggered to span a doppler frequency range from zero doppler to substantially higher doppler frequency value;

(b) comparator means for deriving a measure of reverberation content of said received signal by comparison of signal level on a first of said doppler filter elements with center frequency near zero doppler against signal level on a second of said filter elements with center frequency at substantially higher doppler frequency value, said comparator means providing an output signal indicative of any difference in signal levels on said first and second filter elements and thus of reverberation content of the received signal; and (c) an adaptive notch filter interposed in the line of transmission of said received signal to said doppler filter bank and operative to insert a notch centered near the zero doppler frequency in the received signal spectrum as transmitted therethrough, said adaptive filter being responsive to the output signal of said comparator means to adjust the depth and width of the notch inserted in relation to the reverberation content of the received signal spectrum.

7. In a continuous wave sonar system, a receiver signal processor comprising:

(a) a doppler filter comb including a plurality of filter teeth at staggered frequencies, a first of said teeth being located close to the center of the received signal spectrum so as to pass both reverberation and noise, and a second of said teeth being widely spaced from the first so as to pass noise but little or no reverberation;

(b) means for deriving a first control signal indicative of signal level on said second tooth to provide a measure of noise content of said received signal spectrum, and deriving a second control signal indicative of any difference in signal levels between said first and second teeth to provide a measure of reverberation content of said received signal spectrum;

(c) an automatic gain control loop including variable gain means for adjusting the level of the received signal as transmitted to said doppler filter comb in response to said first control signal; and (d) an automatic notch control loop including an adaptive notch filter responsive to said second control signal to insert a notch centered near the zero doppler frequency in the received signal as transmitted to said doppler filter comb and of shape approximating the inverse of the reverberation spectrum as measured across said first and second teeth of the comb filter.

8. A sonar receiver signal processor as defined in claim 7 further comprising an automatic frequency control loop including means for sensing and generating a third control signal in response to any deviation of the mean frequency of the received signal spectrum from near the zero doppler frequency, and means responsive to said third control signal to correct the frequency deviation thus sensed.

9. A sonar receiver signal processor as defined in claim 7 further comprising means responsive to signal level on a third tooth of said doppler filter comb located near said second tooth, and means for combining signal inputs from said second and third teeth so as to pass only signals which are common to both teeth to said means for deriving the control signals for said automatic gain and automatic notch control loops, to thus render the control action of those loops insensitive to target signal content of the received signal.

* * * * *